United States Patent [19]

Couasnon et al.

[11] Patent Number: 4,550,407
[45] Date of Patent: Oct. 29, 1985

[54] METHOD OF ANALYZING BROADCAST DATA, A NETWORK ANALYZER IMPLEMENTING SUCH A METHOD, AND RECEIVER EQUIPMENT USING SUCH AN ANALYZER

[76] Inventors: Tristan de Couasnon; Jean L. Bellet, both of 173, Bl. Haussmann, 75008 Paris, France

[21] Appl. No.: 504,305

[22] Filed: Jun. 14, 1983

[30] Foreign Application Priority Data

Jun. 18, 1982 [FR] France ................................ 82 10711

[51] Int. Cl.$^4$ ........................... G06F 3/14; H04N 7/08
[52] U.S. Cl. ........................................ 371/29; 358/10; 358/147
[58] Field of Search .................... 371/29, 22; 358/147, 358/10

[56]  References Cited
U.S. PATENT DOCUMENTS 4,052,719 10/1977 Hutt et al. ............................ 358/147
4,303,941 12/1981 Marti et al. .......................... 358/147
4,479,146 10/1984 Cohn ................................... 358/147

OTHER PUBLICATIONS

Thompson, Designing for Consumer Electronics–Telext and Viewdata, Electronic Engineering, vol. 52, No. 633, Jan. 1980, pp. 61–77.
Vincent et al., Telidon Teletext System Field Trials, IEEE Trans. on Consumer Electronics, vol. CE-27, Aug. 1981, pp. 530–535.
Bertron, Les Mesures Analogiques et Automatiques en TV, Toute L'Electronique, No. 464, May 1981, Paris, France, pp. 40–45.

Primary Examiner—Charles E. Atkinson

[57]  ABSTRACT

A teletext network analyzer includes a coupler for forwarding received data to a data processor. The coupler is programmable by the data processor to select data associated with one or more hierarchical levels in a data broadcasting standard. A data processor includes a data analysis task and a results synthesis task for analyzing the data forwarded by the coupler and for synthesizing a teletext image representative of the results of the analysis. The image is displayed on a videographic terminal primarily intended for displaying the broadcast data.

7 Claims, 5 Drawing Figures 4,550,407

METHOD OF ANALYZING BROADCAST DATA, A NETWORK ANALYZER IMPLEMENTING SUCH A METHOD, AND RECEIVER EQUIPMENT USING SUCH AN ANALYZER

The invention relates to data broadcasting networks, and more particularly to a method of analyzing broadcast data, and to a test tool known as a "network analyzer" for implementing the method and suitable for use in conventional receiver equipment.

BACKGROUND OF THE INVENTION

In data broadcasting networks, eg. in the "ANTIOPE" teletext network, data may be broadcast in a conventional TV broadcast, or by cable, or by satellite. Given such diversity and the large number of receiver points, a need has appeared for a test tool which is easy to integrate into receiver equipment and which is capable of measuring the quality of reception on the basis of the received data, of monitoring the network, and of displaying its results.

The present invention provides a method capable of being used to satisfy this need.

SUMMARY OF THE INVENTION

The present invention provides a method of analyzing broadcast data which is encoded in a structure having a plurality of hierarchical levels, and which is intended to be interpreted and displayed by a videographic display terminal, wherein the method comprises:
- a first step in which an operator instructs that data be selected from a given level and that said data be analyzed in a selected mode from a plurality of analysis modes, said modes comprising: a "transparent" mode for extracting parameters present in the transmitted data and relating to characteristics of the data being broadcast; a "programmed" mode for measuring parameters relating to transmission conditions; and a "capture" mode for storing raw data as received prior to processing or interpretation;
- a second step in which the results of the selected analysis are prepared in the form of synthesized images which are encoded using the standard appropriate to the videographic display terminal, said images being representative of the parameters which have been extracted or measured or of the raw data stored before being interpreted; and
- a third step of interpreting and displaying said results of the selected analysis as encoded using said videographic standard.

The present invention also provides a network analyzer implementing the above method, and receiver equipment fitted with such an analyzer.

DETAILED DESCRIPTION OF THE PREFERRED EMBODIMENT

Teletext type data broadcasting networks serve to display text on a television receiver screen, with the text being made up of alphanumeric characters (ie. any mixture of alphabetic characters and numeric characters) together with simple graphic characters. The corresponding data is transmitted by TV broadcast transmitters, either embedded in a normal TV program but without interfereing therewith, or else over a special channel. Users need to have a suitably adapted receiver associated with a terminal equipment in order to demodulate and decode the data and to instruct the receiver to display a page or a succession of pages selected from the range of transmitted messages.

The broadcast data is encoded in a structure having a plurality of hierarchical levels. Typical levels include header sequences for identifying "magazines" of data "pages", header sequences for identifying "pages" within a "magazine" and, of course, the individual pages of data for display. Within a page, some of the data is displayable data, while other data gives instructions concerning the manner in which the displayable data should be displayed, eg. flashing, or double height. Other levels may indicate the source of the broadcast data, or may flag particular standards, protocols, formats, or procedures.

Figure 1:
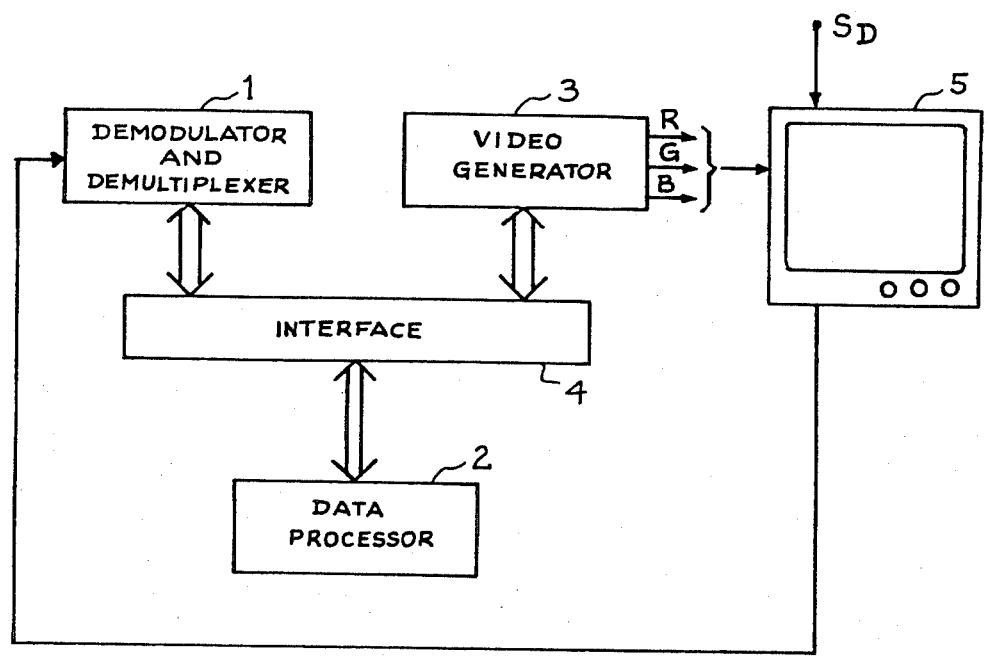
FIG. 1 is a block diagram showing the general organization of receiver equipment for use in a data broadcasting network.

FIG. 1 shows the general structure of a terminal equipment for use in a teletext type data broadcasting network in which the data is transmitted in packets in a multiplexed signal which includes both said packets and a conventional video signal.

A decoder has an input coupled to an output $S_D$ from a broadcasting path, and has an output for delivering broadcast data after separating wanted data from any other data that may be passing along the same broadcasting path.

In a terminal equipment for a teletext network, the decoder portion comprises a demodulator and demultiplexer circuit 1 which separates digital data transmitted by the television network from the normal programs in the event that the data is being transmitted over a channel which is also being used for normal programs. The decoder further includes a digital data processor unit 2 which is coupled to the output from the demodulator and demultiplexer circuit 1 by an interface 4. Finally the decoder includes a video generator 3 which is coupled to the output from the processor unit 2 by the interface 4, and which directly supplies red R, green G, and blue B color video signals to cause the data to be displayed on a color video display screen, eg. the tube of a TV receiver 5.

A network analyzer in accordance with the invention is included in this terminal equipment to act on request to test, measure, or monitor the data being transmitted over the network as received by the equipment. The analyzer synthesizes teletext type images representative of the results obtained, and, on request, causes said images to be displayed on the video screen that would otherwise be displaying the broadcast data in conventional manner. The synthetic images may be in any of various display modes available to the terminal, which may conventionally be alphamosaic mode, alphageometric mode or alphaphotographic mode.

For this purpose, the processor unit 2 in the terminal equipment is programmed with tasks for processing the data available at the output from the demodulator and demultiplexer circuit 1, together with tasks for encoding the results of said processing tasks in order to display the results via the video generator 3.

The terminal equipment itself thus becomes a tool for testing the data, for monitoring a data broadcasting network, or for measuring the quality of the broadcast data, eg. in terms of an error rate.

When the apparatus is acting as a tool for testing data, the network analyzer may operate in a transparent mode in which it analyzes the data while at the same time displaying the data in conventional manner. This type of network analysis is very useful, particularly while developing and debugging equipment are also in the broadcast chain.

For monitoring the network, the analyzer also includes means for recording parameters specific to the data signal, and means for synthesizing a display representative of said parameters. Such monitoring is performed automatically on request from a terminal control device, eg. a remote control key-pad.

Finally, for measuring the quality of the data broadcast level, the network analyzer further includes measuring means for use during measurement campaigns. If each TV receiver fitted with a suitable decoder constitutes a possible measuring point, choosing a representative sample of network measuring points is made that much easier.

The following description gives an example of the method of analyzing broadcast data by detailing some of the features provided by such equipment when suitably programmed.

From a functional point of view, the tasks of the network analyzer can be divided into two groups of tasks:

A first group referred to as "process A" which performs analysis functions per se and which operates the interface with the receiver circuit; and A second group referred to as "process B" which reacts to user commands and which makes use of information provided by the process A analysis to synthesize an image in response to user commands and to transmit said image to the receiver tube.

Functionally, the two processes may be executed in parallel, but the processor unit's computing power may not be adequate for performing the processes in parallel if data is being received at a high data rate at the input to the demodulator and demultiplexer circuit 1.

The following description relates to an embodiment in which the two processes are executed sequentially. This enables a degree of independence to be maintained between the processing applied to the data, and the rate at which data is received. The description should not be taken as limiting the invention to this particular arrangement.

The means used for analyzing the network are similar to the means conventionally used for receiving the transmitted data.

Figure 2:
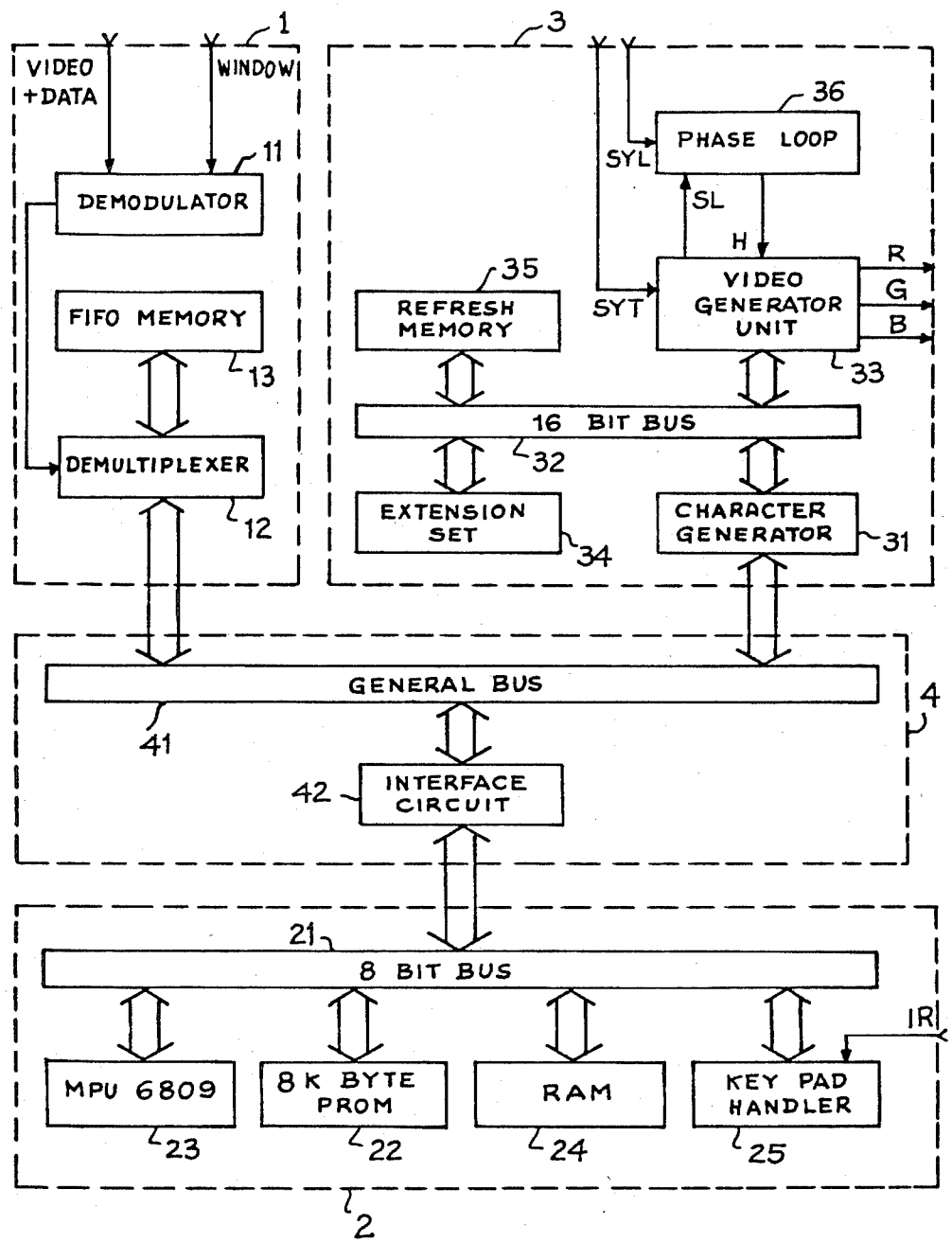
FIG. 2 is a more detailed block diagram of receiver equipment incorporating a network analyzer.

FIG. 2 shows said means in detail. The demodulator and demultiplexer circuit 1 comprises a demodulator 11 connected to receive a composite signal (video+data) and a control signal (window) for selecting data to be demodulated. The output of the demodulator is connected to the input of a demultiplexer 12 which separates the data signal from the video signal. The demodulated and separated data signals are then stored in a first-in, first-out (FIFO) buffer memory 13, from which they are extracted on request by the processor unit 2. To do this, the output from the demultiplexer is coupled to a processor unit bus 21 via the interface 4. The interface 4 comprises a general data transmission bus 41 and an interface circuit 42. In addition to the bus 21, the processor unit 2 includes a programmed read only memory (PROM) 22 having a capacity of 8K bytes for example, a microprocessor unit (MPU) 23, eg. a type 6809, a random access memory (RAM) 24, and a key pad handler 25, all coupled together by said bus 21. The control key pad may operate by emitting infrared signals IR, for example.

To display an image, the processor unit 2 acts via the interface 4 and the video generator 3. The video generator 3 comprises a character generator 31 which is coupled to the general bus 41 of the interface 4. The character generator is also coupled to a video generator bus 32 which is coupled to a video generator unit per se for supplying R, G and B color component signals for application to the video display screen as a function of the characters to be displayed. The bus 32 is also coupled to an extension set memory 34 and to a refresh memory 35. The video generator unit 33 receives a frame synchronizing signal SYT from the TV. A line synchronizing signal SYL from the TV is received by the control input to a phase loop 36 which supplies a clock signal H to the video generator unit 33. The video generator unit 33 supplies a line signal SL to the phase loop 36.

Without going into further detail in the various subassemblies, the above block diagram could well be for conventional receiver equipment for teletext, eg. ANTIOPE.

The same design shows a terminal which is also a broadcast data analyzer once it is understood that:

(1) the program memory 22 contains various special processing programs, including programs for responding to processing requests obtained by dialog with a user during a test procedure which may be interactive, programs for analyzing broadcast data, and programs for synthesizing displays representative of the results of such analysis;
(2) the RAM 22 has a suitable capacity and is of suitable organization for containing the data required for such special processing;
(3) the demultiplexer 12 which normally only transmits useful data, now comprises a programmable channel selector 112 (see FIG. 3) which includes a programmable coupler for transmitting data corresponding to any one of the hierarchical levels of the broadcasting standard applicable to the data being analyzed, eg. header sequences in the event that said sequences are being verified; and
(4) the video generator includes a video driver for displaying test results once they have been synthesized into a conventional form.

Using such equipment, the user can access three types of service via a control key pad:
(1) An analysis of the transmission procedure and protocol;
(2) Error rate measurements; and
(3) Network monitoring.

Figure 3:
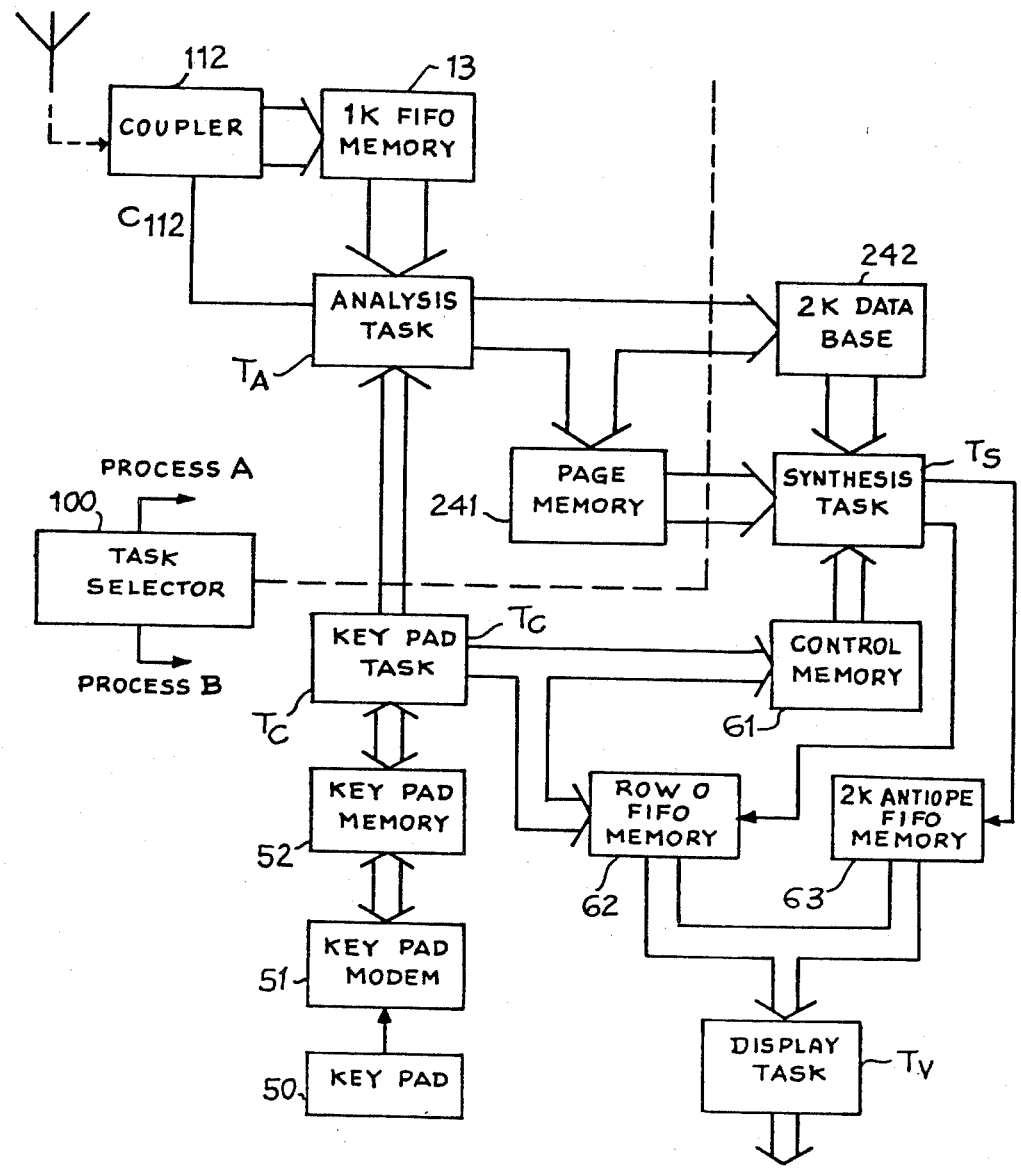
FIG. 3 is a functional diagram of the tasks performed by the network analyzer.

To make all this possible, the PROM 22 and the microprocessor 23 in the data processor 2 control tasks and data transfers outlined in FIG. 3.

A task selector 100 co-ordinates process chaining, and the chaining of the tasks that make up the individual processes.

In process A, a programmable coupler or channel selector 112 selects the data to be retained from the total data received from the demodulator 11. A coupler control input $C_{112}$ is provided for this purpose. The selected data present at the output from the coupler 112 is transmitted to the FIFO buffer memory 13, which may have a capacity of 1K bytes, for example.

The analysis task $T_A$ takes data from the buffer memory 13 and analyzes it in one of three possible ways. A flow chart for this task is described in greater detail below with reference to FIG. 4. The data resulting from the analysis is transmitted to the RAM 24 (FIG. 2), and depending on the mode of analysis in operation it is placed either in a data base 242 or in a page memory 241. The above functions constitute the process A.

In the process B, an operator dialogs with the equipment via a control key pad 50 for requesting the performance of particular tasks. A key pad modulator-demodulator (modem) 51 is coupled to the key pad 50 and recognizes keyed-in data or user responses to questions put during interactive dialog. The modem 51 is coupled to a key pad memory 52 which serves to supply the data required by the key pad driver task $T_C$. The key pad task is a self-contained user dialog task which forwards the data needed by the analysis task $T_A$ (process A) and by a synthesis task $T_S$ (process B) to those tasks. The synthesis task $T_S$ processes data stored in memory, whether in the page memory 241 or in the data base 242, under control of the operator via the key pad task $T_C$ and a control memory 61. The output data from the synthesis task $T_S$ is supplied to two FIFO memories 62 and 63 in the video generator. The memory 62 is a row O memory and the memory 63 is a 2K byte ANTIOPE memory following the usual practice for standard ANTIOPE video generators. The data is called by a display task $T_V$ for conversion into color video signals suitable for direct application to a TV display tube.

The system is naturally driven by a general system time base, not shown in FIG. 3.

Figure 4:
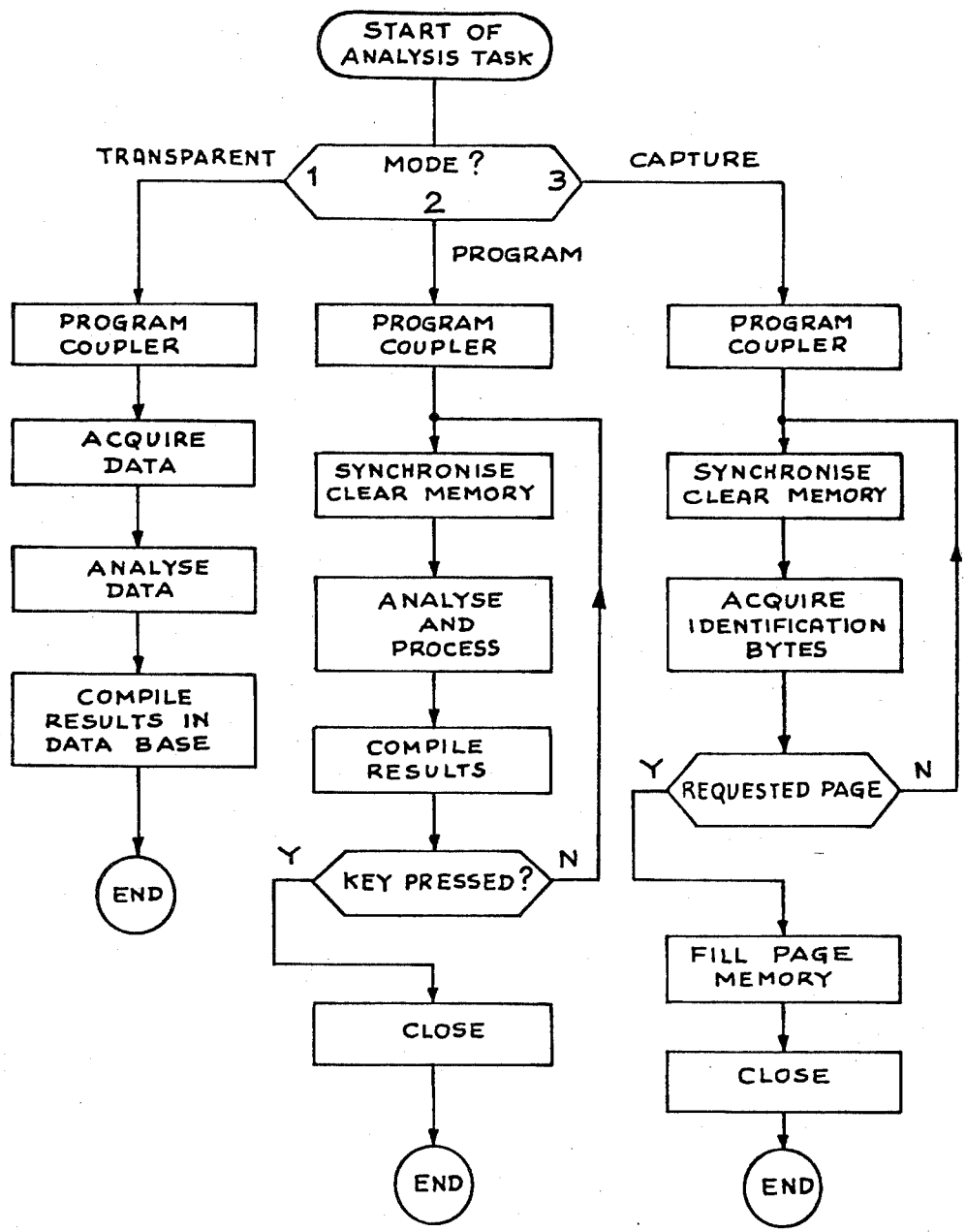
FIG. 4 is a flow chart of the analyzer's analysis functions.

FIG. 4 is the flow chart of the analysis task in one particular embodiment of a network analyzer in accordance with the invention. As indicated above, analysis can take place in three possible modes.

The first mode is a "transparent" mode. This mode is called on initialization, or by pressing key 1 on the key pad. It does not require any further user information. In this mode, the channel selector or coupler 112 is programmed to transmit ordinary data. After programming the coupler and acquiring data, the analysis task searches for various parameters in the received data in order to recognise the standard, the protocol, the logical channels or magazines present, their formats, etc. The following results may be obtained: four magazines are present. The magazines are numbered 01, 02, 04 and 0C. The procedure byte is 7E. There are ten lines of data per frame representative of the source. Etc. These results are stored in data tables in the data base memory during a "resulting compiling" phase. The transparent mode analysis task is interruptible and is terminated if another mode of analysis is requested.

The second analysis mode is a "programmed" mode. Instead of automatically taking account of all the data and analyzing some of its features, this mode takes only selected data into consideration and processes it using a defined program. The coupler driver is thus called on to perform a number of preliminary functions concerned with interpreting various levels of the broadcast protocol, thereby offloading a portion of this work from the data processor. By way of example, the program may be a program for analyzing attributes by analyzing header sequences to give results characteristic of the modalities of the dialog with the display terminal, or it may be a program for calculating error rates to give results characteristic of the transmission link used by a particular magazine. In this second mode, the first step is naturally to program the channel-selecting coupler 112 to transmit the data that is to be analyzed. In a second step, the analysis is synchronized on the received standard so that the standard can be recognised. Once synchronized, the analysis task processes data corresponding to the selected magazine by analyzing the attributes of the different articles (or displayable pages) on the basis of their header sequences. For example: number of pages in the magazine; and for each page: page number and page type, eg. cover, fly-leaf, etc . . . . Or the analysis task may calculate the error rate for each page. In the following step, the results of the analysis are compiled in the data base. Then the key pad is tested to see if a key has been pressed. If another key has been pressed, this mode of analysis may be interrupted to switch to one of the other modes, otherwise analysis continues in the same mode. This second mode is linked with two synthesis modes which generate respective images representative of page attributes or of their detected errors.

The third possible mode is a "capture" mode which is used to store all the data concerning one magazine page as transmitted and before interpretation by a display terminal. As in the preceding modes, this mode begins by programming the coupler, this time to transmit all data just as it is received. In a second step the task gets into synchronization with the selected magazine. Once in synchronization, the data is analyzed to acquire the bytes identifying a given page. If these bytes do not match the required page, acquisition continues until the requested page has been found. Once found, the data relating to the page is transmitted in the form it is received to the page memory zone 241 (see FIG. 3) and the corresponding analysis task is then terminated. This mode, after suitable synthesis, enables the raw code defining a page to be displayed, ie. in a form prior to the normal interpretation performed by the video generator. This analysis mode is linked to a synthesis mode which enables syntax errors in the raw code to be highlighted, as explained below.

Figure 5:
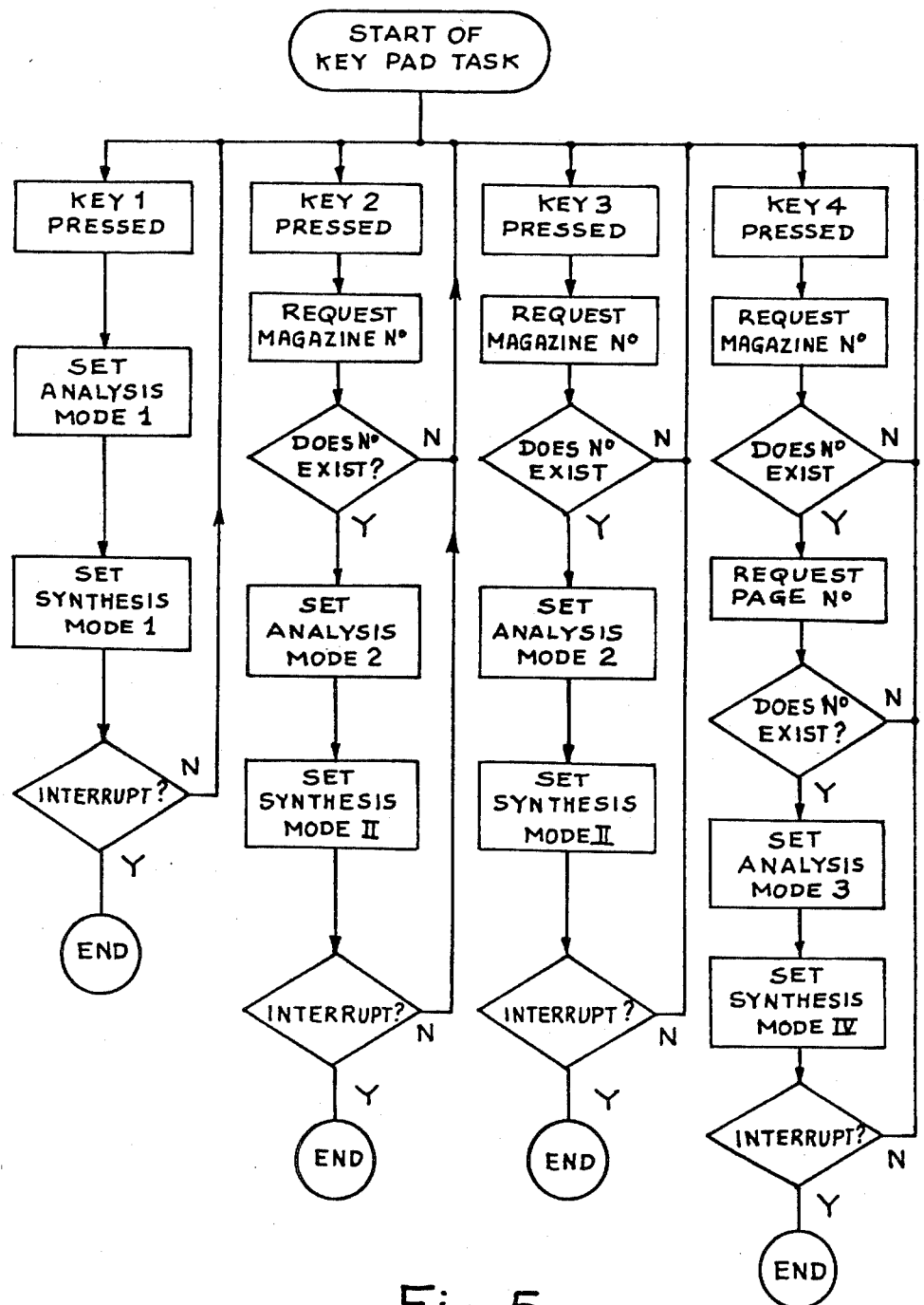
FIG. 5 is a flow chart of the analyzer's key pad task.

In process B, the first task to be performed is the key pad task $T_C$ whose flow chart is shown in FIG. 5. This task recognizes the nature of instructions given from the key pad by pressing a key, sets the analysis task into the corresponding mode, and transmits control codes to the control memory 61 (FIG. 3) for establishing the appropriate program in the synthesis task $T_S$.

For example, when the key number 1 is pressed, the user is requesting transparent mode analysis, ie. an analysis of all received data as indicated above. The key pad task sets the analyzer into transparent mode, ie. into mode 1, and then generates control codes for the synthesis task $T_S$. When in this "mode I", the synthesis task consists in reading the data stored in the tables of the data base zone 242 (FIG. 3) and in encoding said data using conventional videographic image description code. By way of example, each possible magazine may be associated with a particular square in a grid formed in the image, and squares corresponding to magazines which are present may then be colored. The synthesis task serves to generate the videographic image on the basis of the data.

Once key 1 has been released, the key pad task may be interrupted.

When key 2 is pressed, as can be seen in the FIG. 5 flow chart, the user is asking for a header sequence to be analyzed, ie. as indicated above, for the attributes of the different pages of a given magazine to be analyzed. In response to the key being pressed, the key pad task returns a request to the user asking for the number of the magazine for which the user would like a videographic summary. The key pad task inspects the data base zone to check whether the requested magazine is actually being broadcast (and if not the key pad task returns to its initial state), and then sets the analyzer into mode 2, and programs it to analyze header sequences. The key pad task then generates control codes to set the synthesis task into a mode II corresponding to synthesizing an image representative of analyzed header sequences. The synthesis task can then inspect the data now in the data base zone to generate a new image. For example a grid may be set up in which squares represent pages, with the type of each page whose attributes have been recognized being displayed in a distinctive color: eg. red for a cover page, blue for an index, and white for an ordinary numbered page.

When key 3 is pressed, the user is requesting error rate analysis. As for header sequence analysis, the key pad task requests the number of the magazine to be analyzed and verifies whether a magazine of that number actually exists. If it does, the key pad task sets the analyzer task into mode 2 and programs it to analyze error rates, with the resulting data being stored in the data base zone. The key pad task then generates control codes to set the synthesis task into mode III corresponding to synthesizing a videographic image representative of error rates. For example, a color scale representative of different average error rates in a page may be established. The synthesis task increments an error counter each time a parity error is detected in a given page. The image is then generated using the grid of squares representing different magazine pages, and each square is colored with the color from the scale that corresponds to the measured error rate.

When key 4 is pressed, the user is requesting a direct display of the codes as transmitted. The key pad task again asks for the magazine number to be displayed, and then asks for the page number. Each time it checks that the user's replies correspond to an available magazine or page as detected during a previous transparent mode analysis. The key pad task then sets the analyzer task into capture mode (mode 3), and generates control codes to set the synthesis task into mode IV for direct viewing of the captured videographic image codes. Extra processing may be performed by the synthesis task, eg. it may use inverted video or a changed color to highlight characters for which a parity error has been detected. It is also possible to perform syntax analysis to check whether the characters captured in this way actually correspond to the videographic code being used, eg. ANTIOPE code. If syntax errors are detected, the synthesis task can likewise highlight the corresponding characters, eg. by changing their color.

The synthesis task sends the codes it has generated to the memories 62 and 63.

The display task T$_V$ takes data from said memories and converts it into signals suitable for driving a video display, eg. the TV receiver tube 5 shown in FIG. 1. This task is part of the host receiver equipment, and is provided to interpret the videographic image description language being used (ie. ANTIOPE in the present example). The user may use an additional key on the key pad to view a given videographic image in its normal form, eg. an image whose error rate has just been analyzed.

The invention is not limited to the embodiment described above. Various modifications are possible, including, for example, an automatic mode in which a sequence of successive pages are analyzed in turn. For example an "auto" variable may be set to 1 for refreshing the calculated data in real time, and to a value n for refreshing every n successive pages transmitted in the same article (a given page of a magazine).

Also, further processing could be performed on the received data, and the characteristic data as captured or calculated during such further processing could be displayed in various ways so long as data-representing images are synthesized for display on the video display.

While the invention has been described in connection with what is presently considered to be the most practical and preferred embodiments, it is understood that the invention is not to be limited to the disclosed embodiment but, on the contrary, is intended to cover various modifications and equivalent arrangements included within the spirit and scope of the appended claims which scope is to be accorded the broadest interpretation so as to encompass all such modifications and equivalent structures.

We claim:

1. A method of analyzing broadcast data which is encoded in a structure having a plurality of hierarchical levels, and which is intended to be interpreted and displayed by a videographic display terminal, wherein the method comprises:
    a first step in which an operator instructs that data be selected from a given level and that said data be analyzed in a selected one from a plurality of analysis modes, said modes comprising: a "transparent" mode for extracting parameters present in the transmitted data and relating to characteristics of the data being broadcast; a "programmed" mode for measuring parameters relating to transmission conditions; and a "capture" mode for storing raw data as received prior to any processing or interpretation;
    a second step in which the results of the selected analysis are prepared in a form of synthesized images which are encoded using a standard appropriate to said videographic display terminal, said images being representative of the parameters which have been extracted or measured or of the raw data stored before being interpreted; and
    a third step of interpreting and displaying said results of the selected analysis as encoded using said videographic standard.

2. An analysis method according to claim 1, wherein said "programmed" mode of analysis includes one of (a) detecting parameters relating to said videographic standard which are present in header sequences prior to data to be displayed, and (b) detecting errors in data received at a given level.

3. An analysis method according to claim 1, wherein operator instructions in said first step select a program for selecting (a) data, (b) an analysis mode for analyzing the selected data, and (c) an associated synthesis mode for synthesizing an image representative of results of the selected analysis mode.

4. An analyzer for analyzing broadcast data which is encoded in a structure having a plurality of hierarchical levels, and which is intended to be interpreted by a videographic display terminal, said structure and said videographic display terminal having a broadcast standard, comprising:

a programmable coupler for transmitting encoded data associated with any one of said levels in said broadcast standard; and a data processor coupled to said programmable coupler, including: task analyzer means for selecting an analysis mode from among a "transparent" mode, a "programmed" mode and a "capture" mode, analyzing said encoded data in one of said modes and providing results of the analysis, said analysis being performed in said "transparent" mode in order to acquire parameters present in said encoded data relating to characteristics of the transmission, said encoded data being analyzed in said "programmed" mode to measure parameters relating to transmission conditions, said encoded data being analyzed in said "capture" mode for storing raw data prior to any processing or interpretation; and synthesis task means for reading said results of the encoded data analysis and preparing said results in a form of synthesized images which are encoded using the broadcast standard appropriate to said videographic display terminal;

said data processor displaying said encoded synthetic images on said videographic display terminal.

5. An analyzer according to claim 4, further including key pad task means, coupled to said task analyzer means and adapted to be used by a user, for performing an interactive dialog between said task analyzer means and said user, said key pad task means including a key pad.

6. An analyzer according to claim 4, further including:

data base memory means coupled to said task analyzer means, for storing said results of said encoded data analysis; and data storage memory means, coupled to said synthesis task means and adapted to be connected to said videographic display terminal, for storing said encoded synthetic images.

7. An analyzer according to claim 5, further including a control memory coupled between said key pad task means and said synthesis task means.

* * * * *